US012481241B2

(12) United States Patent
Sekiguchi et al.

(10) Patent No.: US 12,481,241 B2
(45) Date of Patent: Nov. 25, 2025

(54) IMAGE FORMING SYSTEM

(71) Applicant: CANON KABUSHIKI KAISHA, Tokyo (JP)

(72) Inventors: Hajime Sekiguchi, Chiba (JP); Toshifumi Itabashi, Ibaraki (JP); Hiroyuki Nakagawa, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/886,678

(22) Filed: Sep. 16, 2024

(65) Prior Publication Data

US 2025/0093811 A1 Mar. 20, 2025

(30) Foreign Application Priority Data

Sep. 19, 2023 (JP) ................................ 2023-151609

(51) Int. Cl.
*G03G 21/16* (2006.01)
*B65H 3/48* (2006.01)
(Continued)

(52) U.S. Cl.
CPC ........... *G03G 21/1633* (2013.01); *B65H 3/48* (2013.01); *G03G 15/0142* (2013.01); *G03G 15/234* (2013.01); *G03G 15/6502* (2013.01); *G03G 15/6511* (2013.01); *G03G 15/6514* (2013.01); *G03G 15/6529* (2013.01); *B65H 2406/122* (2013.01); *G03G 2215/00016* (2013.01); *G03G 2215/00379* (2013.01);
(Continued)

(58) Field of Classification Search
CPC ............. G03G 15/234; G03G 15/6511; G03G 15/6514; G03G 15/6529; G03G 15/0142; G03G 15/6502; G03G 21/1633; G03G 2215/00016; G03G 2215/00379; G03G 2215/00383; G03G 2215/00388; G03G 2215/00392; B65H 3/48; B65H 2406/122
See application file for complete search history.

(56) References Cited

U.S. PATENT DOCUMENTS

2006/0140669 A1* 6/2006 Sato .................. G03G 21/1647 399/121
2008/0185943 A1* 8/2008 Hirose .................... B65H 5/00 271/278
2022/0066383 A1* 3/2022 Sato .................. G03G 21/1623

FOREIGN PATENT DOCUMENTS

JP 2008137742 A 6/2008
JP 2014095813 A 5/2014

* cited by examiner

*Primary Examiner* — Joseph S Wong
(74) *Attorney, Agent, or Firm* — Canon U.S.A., Inc. IP Division

(57) ABSTRACT

An image forming system includes an image forming apparatus and a feeding device, the image forming apparatus including an image forming unit, a housing, an opening/closing door openable and closable between a first closed position and a first open position, and a support unit openable and closable between a second closed position and a second open position and configured to support a sheet when the support unit is at the second open position, the feeding device being movable in a direction horizontal to the image forming apparatus, configured to move to a coupled position and a decoupled position and feed the sheet to the image forming apparatus when the feeding device is at the coupled position, wherein when the feeding device is at the decoupled position and the opening/closing door is at the first open position, the feeding device overlaps the support unit as viewed from a first direction.

10 Claims, 6 Drawing Sheets

(51) Int. Cl.
*G03G 15/00* (2006.01)
*G03G 15/01* (2006.01)
*G03G 15/23* (2006.01)

(52) U.S. Cl.
CPC ............. *G03G 2215/00383* (2013.01); *G03G 2215/00388* (2013.01); *G03G 2215/00392* (2013.01)

IMAGE FORMING SYSTEM

BACKGROUND

Field

The present disclosure relates to an image forming system that forms an image on a sheet.

Description of the Related Art

In recent years, there has been a demand for electrophotographic image forming apparatuses, such as copying machines, printers, and facsimiles, that generate a large number of printer outputs or generate high-quality, high-definition printer outputs.

Japanese Patent Application Laid-Open No. 2008-137742 discusses a large-capacity feeding device that is capable of supplying a large number of sheets and is coupled to a side surface of an image forming apparatus in order to generate a large number of printer outputs.

On the other hand, in order to generate high-quality, high-definition printer outputs, it has been becoming desirable to use special sheets such as coated paper and thick paper. Japanese Patent Application Laid-Open No. 2014-95813 discusses a manual feeding device attached to a side wall of an image forming apparatus in order to feed such special sheets. The manual feed tray discussed in Japanese Patent Application Laid-Open No. 2014-95813 protrudes outward from the side surface of the apparatus main body of the image forming apparatus when the manual feed tray is closed with respect to the apparatus main body.

However, if the large-capacity feeding device discussed in Japanese Patent Application Laid-Open No. 2008-137742 is coupled to the manual feeding device discussed in Japanese Patent Application Laid-Open No. 2014-95813, there will be a possibility of occurrence of a problem as described below. When the side door of the image forming apparatus with the manual feed tray is opened wide for maintenance of the inside of the image forming apparatus, the protruding manual feed tray may interfere with the large-capacity feeding device. That is, it may be difficult to secure a sufficient working space during maintenance. Although a sufficient working space can be obtained by removing the manual feed tray from the device body, this will reduce the workability of maintenance.

SUMMARY

The present disclosure is directed to providing an image forming system that improves the workability of maintenance of an image forming apparatus.

According to some embodiments, an image forming system includes an image forming apparatus and a feeding device. The image forming apparatus includes an image forming unit configured to form an image on a sheet, a housing that stores the image forming unit, an opening/closing door that is provided so as to be capable of turning around a rotary shaft horizontal to the housing, and that is openable and closable between a first closed position at which the opening/closing door is closed with respect to the housing and a first open position at which the opening/closing door is opened with respect to the housing, and a support unit that is provided so as to be capable of turning around a rotary shaft horizontal to the opening/closing door, that is openable and closable between a second closed position at which the support unit is closed with respect to the opening/closing door and a second open position at which the support unit is opened with respect to the opening/closing door, and that is configured to support a sheet when the support unit is at the second open position. The feeding device is movable in a direction horizontal to the image forming apparatus, configured to move to a coupled position at which the feeding device is coupled to the image forming apparatus, move to a decoupled position at which the feeding device is decoupled from the image forming apparatus, and feed the sheet to the image forming apparatus when the feeding device is at the coupled position. When the feeding device is at the decoupled position and the opening/closing door is at the first open position, the feeding device overlaps the support unit as viewed from a first direction from the image forming apparatus to the feeding device at the coupled position.

Further features of the present disclosure will become apparent from the following description of exemplary embodiments with reference to the attached drawings.

DESCRIPTION OF THE EMBODIMENTS

Image Forming System

Figure 1:
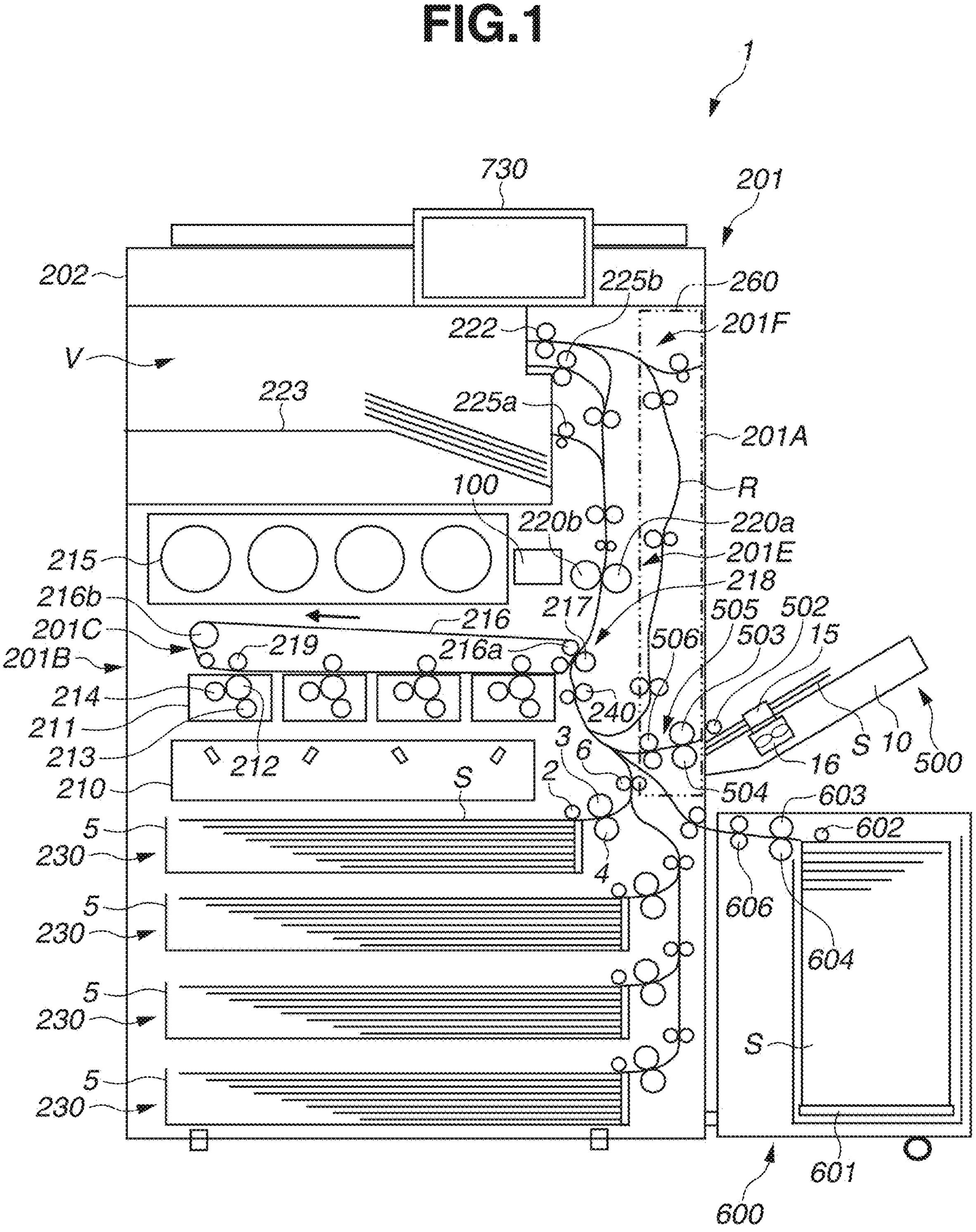
FIG. 1 is a cross-sectional view of an image forming system according to an exemplary embodiment.

Various exemplary embodiments, features, and aspects will be described with reference to the drawings. A cross-sectional view of a schematic configuration of an image forming system 1 according to the present exemplary embodiment will be described with reference to FIG. 1. The image forming system 1 has an image forming apparatus 201 and a large-capacity feeding device 600. The image forming apparatus 201 is a tandem-type intermediate transfer laser beam printer that utilizes an electrophotographic process. The image forming apparatus 201 can form a full-color or monochrome image corresponding to print image data output from a host device coupled to a control unit 100 and output the same on a sheet S that is a recording medium.

The control unit 100 is a control unit or controller that comprehensively controls the operation of the image forming apparatus 201, and transmits and receives information to and from the host device and an operation unit 730. The control unit 100 performs signal processing, sequence control, and the like for various process devices. The host device is a personal computer, an image scanner, a facsimile, or the like. The control unit 100 has a central processing unit (CPU), a random access memory (RAM), and a read only memory (ROM), and controls each part in the image forming apparatus 201. The CPU may include one or more processors and outputs an output signal to each electric component to operate the electric component at a desired timing and with a desired amount of control, based on the detection signal input from each sensor and the information stored in the ROM. Accordingly, the CPU actually controls the electric components. The ROM and RAM store information data for controlling each part, and the CPU reads the information data from the ROM and writes the same to the RAM.

The image forming apparatus 201 has an apparatus main body 201A, an image forming unit 201B that forms an image on the sheet S, and cassette feeding units 230. An image reading device 202 is provided substantially horizontally on the upper side of the apparatus main body 201A. An ejection space V for ejecting sheets is formed between the image reading device 202 and the apparatus main body 201A. In the present exemplary embodiment, the apparatus main body 201A, more specifically, a frame of the apparatus main body 201A, is an example of a housing.

Each cassette feeding unit 230 feeds the sheets S from a feeding cassette 5 which is a sheet storage unit for storing the sheets S. The cassette feeding unit 230 has a pickup roller 2 that feeds the sheets S from the feeding cassette 5, and a separation roller pair of a feed roller 3 and a retard roller 4 for separating the sheets S sent out from the pickup roller 2. The sheets stored in the cassette feeding unit 230 are separated one by one by the separation roller pair, and are sent to a registration roller pair 240 by a conveyance roller pair 6.

In the present exemplary embodiment, a manual feeding device 500 is provided on a side of the apparatus main body 201A.

Figure 2:
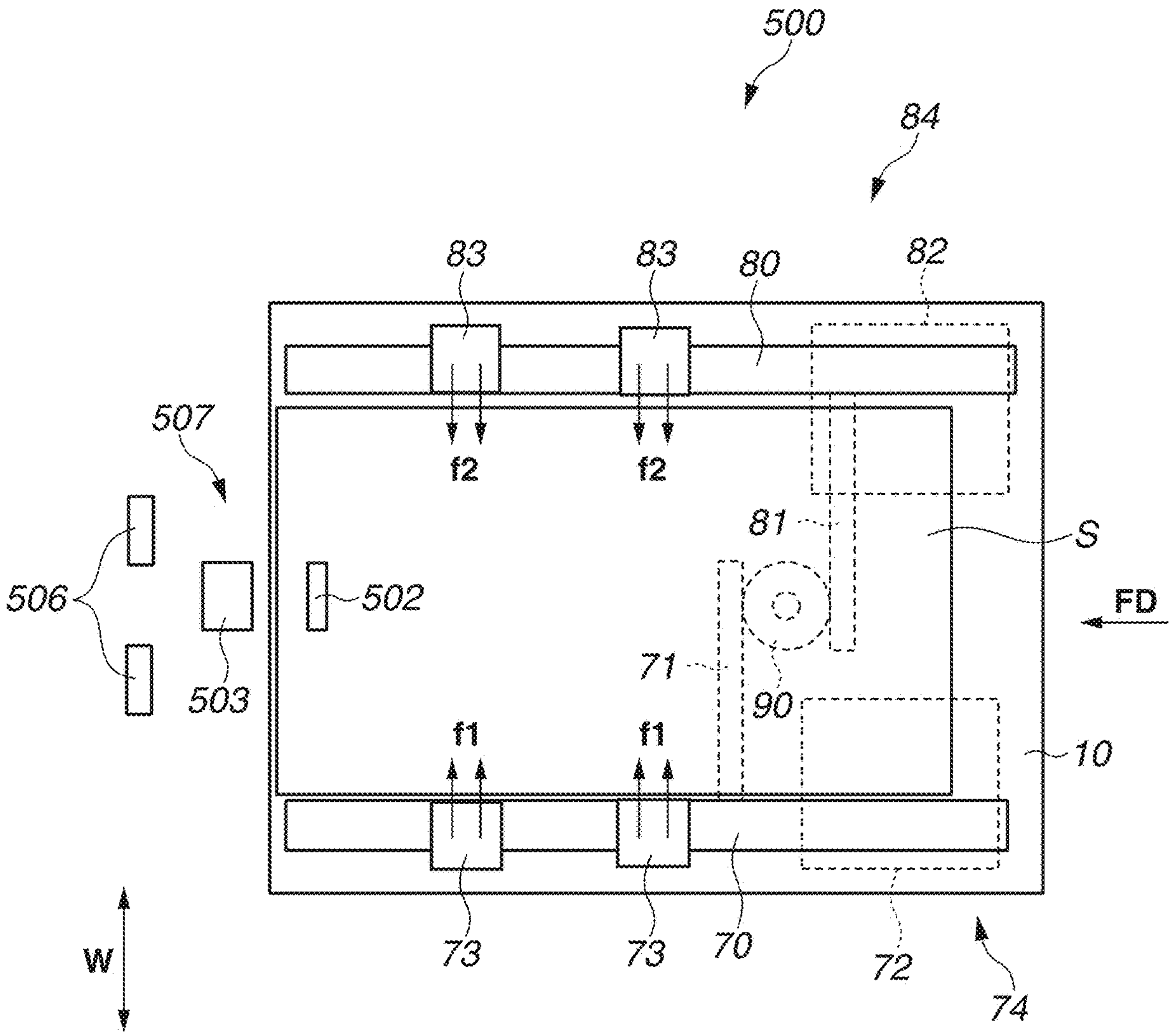
FIG. 2 is a plan view of a manual feed tray of a manual feeding device at an open position according to the exemplary embodiment.

As illustrated in FIGS. 1 and 2, the manual feeding device 500 has a manual feed tray 10 on which sheets are placed, a pickup roller 502 that feeds the sheets from the manual feed tray 10, and a separation roller pair 507 for separating the sheets S sent out from the pickup roller 502. The separation roller pair 507 is made up of a feed roller 503 and a retard roller 504. The sheets S placed on the manual feed tray 10 are separated one by one by the separation roller pair 507 and are sent to the registration roller pair 240 by the conveyance roller pair 506.

The image forming unit 201B forms an image on a sheet fed by the cassette feeding unit 230 or the manual feeding device 500. The image forming unit 201B is of a four-drum full-color type, and includes a laser scanner 210 and four process cartridges 211 for forming toner images of four colors, yellow (Y), magenta (M), cyan (C), and black (K). Each process cartridge 211 includes a photoconductive drum 212, a charger 213 as a charging means, and a developing unit 214 as a developing means. The image forming unit 201B includes a secondary transfer unit 218 arranged above the process cartridges 211, and a fixing unit 201E. Toner cartridges 215 supply toner to the developing units 214.

The secondary transfer unit 218 includes a transfer belt 216 that is wound around a drive roller 216*a* and a tension roller 216*b*. Primary transfer rollers 219 are provided inside of the transfer belt 216, which are in contact with the transfer belt 216 at positions facing the corresponding color photoconductive drums 212. The transfer belt 216 is rotated in the direction of an arrow by the drive roller 216*a* driven by the drive unit. A secondary transfer roller 217 that transfers the color image formed on the transfer belt 216 to the sheet S is provided at a position facing the drive roller 216*a* of the secondary transfer unit 218.

A fixing unit 201E is arranged above the secondary transfer roller 217. A first ejection roller pair 225*a* and a second ejection roller pair 225*b* for ejecting sheets, and a double-sided reversing unit 201F are arranged above the fixing unit 201E. The double-sided reversing unit 201F includes a reversing roller pair 222 capable of rotating forward and backward, and a re-conveyance path R for re-conveying the sheet S with an image formed on one side to the image forming unit 201B.

The operation unit 730 that accepts operations from a user is provided on the upper part of the image forming apparatus 201. The operation unit 730 employs a touch panel system that combines a display function and an input function.

The large-capacity feeding device 600 includes a vertically movable intermediate plate 601 on which sheets are placed, a pickup roller 602 that feeds the sheets placed on the intermediate plate 601, and a separation roller pair for separating the sheets S sent out from the pickup roller 602. The separation roller pair is made up of a feed roller 603 and a retard roller 604.

The sheets S stacked on the intermediate plate 601 are separated one by one by the separation roller pair, and are conveyed to the registration roller pair 240 by a conveyance roller pair 606.

The image forming operation of the image forming apparatus 201 will be described. Upon reception of image data of an original document to be printed, the image forming apparatus 201 performs image processing on the image information, then converts the same into an electric signal, and then transmits the same to the laser scanner 210 of the image forming unit 201B. In the image forming unit 201B, the surfaces of the photoconductive drums 212, which are uniformly charged to a predetermined polarity and potential by the chargers 213, are sequentially exposed to a laser. Accordingly, electrostatic latent images of yellow, magenta, cyan, and black are formed in sequence on the photoconductive drums of the corresponding process cartridges 211.

Thereafter, the electrostatic latent images are developed with corresponding color toner to make them visible, and the color toner images on the photoconductive drums are sequentially transferred and superimposed onto the transfer belt 216 by primary transfer biases applied to the primary transfer rollers 219. Accordingly, toner images are formed on the transfer belt 216.

In parallel with this toner image forming operation, the sheets S are conveyed one by one by the cassette feeding unit 230 or the manual feeding device 500 to the registration roller pair 240, and are corrected for skew by the registration roller pair 240. After the skew correction, the sheet S is conveyed by the registration roller pair 240 to the secondary transfer unit 218, and the toner images are transferred all at once onto the sheet S by a secondary transfer bias applied to the secondary transfer roller 217 in the secondary transfer unit 218.

The sheet S onto which the toner images have been transferred is conveyed to the fixing unit 201E, where the color toner is melt and mixed under heat and pressure at a roller nip portion formed by a pressure roller 220*a* and a heating roller 220*b*, and is fixed as a color image on the sheet S. The sheet S onto which the image has been fixed is ejected into the ejection space V by the first ejection roller pair 225*a* or the second ejection roller pair 225*b* provided downstream of the fixing unit 201E, and is stacked on an ejection tray 223 protruding on the bottom surface of the ejection space V. In the case of forming images on both sides of the sheet S, after the image has been fixed, the sheet S is conveyed to the re-conveyance path R by the reversing roller pair 222, and is conveyed again to the image forming unit 201B.

Manual Feeding Device

The manual feeding device 500 will be described with reference to FIG. 2. As illustrated in FIG. 2, the manual feeding device 500 has the manual feed tray 10, the pickup roller 502, and a pair of a first side regulating unit 70 and a second side regulating unit 80. The manual feed tray 10 is provided on a side surface of the apparatus main body 201A so as to be openable and closable by turning. When being opened from a storage state (closed position) in which the manual feed tray 10 is stored on the side surface of the apparatus main body 201A, the manual feed tray 10 comes into a feeding state (open position) in which sheets can be stacked and fed. The case where the manual feed tray 10 is in the open state will be described below.

The pickup roller 502 feeds the sheet S placed on the manual feed tray 10. The pair of first side regulating unit 70 and second side regulating unit 80 are arranged on the sides of the sheet S in a sheet width direction W that intersects with a feeding direction FD of the sheet S placed on the manual feed tray 10, thereby to regulate the position of the sheet S in the width direction W. The first side regulating unit 70 is an example of a regulating unit, and is provided on the manual feed tray 10 so as to be movable in the width direction W, and regulates the position of the sheet S supported on the manual feed tray 10 in the width direction W. The second side regulating unit 80 is provided so as to be movable in the width direction W in conjunction with the first side regulating unit 70, and comes into contact with the other end of the sheet S placed on the manual feed tray 10 in the width direction W. In the present exemplary embodiment, the width direction W is a direction perpendicular to the feeding direction FD of the sheet S.

The first side regulating unit 70 has a rack 71. Similarly, the second side regulating unit 80 has a rack 81. The racks 71 and 81 are meshed with a pinion gear 90 to interlock with the pinion gear 90. Accordingly, at least one of the first side regulating unit 70 and the second side regulating unit 80 is movable in the width direction W. In the present exemplary embodiment, both the first side regulating unit 70 and the second side regulating unit 80 are movable integrally in the width direction W of the sheet S. One of the first side regulating unit 70 and the second side regulating unit 80 may be fixed so as not to move. Only the first side regulating unit 70 may be provided movably, and the second side regulating unit 80 may not be provided.

The first side regulating unit 70 includes a first air separation unit 74 that has a fan motor 72 and blowing nozzles 73. When the fan motor 72 is driven, air f1 is blown out from the blowing nozzles 73 onto the side surface of a sheet stack placed on the manual feed tray 10. Blowing the air f1 as separation air from the fan motor 72 toward the side end of the sheets S allows the upper sheet S of the sheet stack to be lifted, thereby reducing the adhesion force between the sheets S. That is, the first air separation unit 74 is an example of an air separation unit, and blows air in the width direction W from the first side regulating unit 70 onto the stack of sheets S supported on the manual feed tray 10 to separate the sheets S.

Similarly, the second side regulating unit 80 includes a second air separation unit 84 that has a fan motor 82 and blowing nozzles 83. When the fan motor 82 is driven, air f2 is blown out from the blowing nozzles 83 onto the side surface of the sheet stack placed on the manual feed tray 10 opposite to the side facing the first side regulating unit 70. Blowing the air f2 as separation air from the fan motor 82 toward the side end of the sheets S, in combination with the air f1 blown from the opposite side, allows the upper sheet S of the sheet stack to be effectively lifted, thereby reducing the adhesion force between the sheets S.

When the user selects the manual feeding device 500 and executes an operation to start image formation, the manual feeding device 500 starts sheet feeding. If the sheets S placed on the manual feed tray 10 are sheets of coated paper, for example, the fan motors 72 and 82 are operated. Accordingly, the air f1 and the air f2 are blown from the blowing nozzles 73 and 83 to the end of the sheet stack in the width direction W.

After a lapse of a predetermined time since the start of the blowing of the air f1 and air f2, the uppermost sheet S of the sheets between which the adhesive force has been reduced, is fed by the rotating pickup roller 502 and sent to the separation roller pair 507 made up of the feed roller 503 and the retard roller 504. The one sheet S separated by the separation roller pair 507 is conveyed to the registration roller pair 240 by the conveyance roller pair 506.

Opening/closing Structure of Door and Manual Feed Tray

The opening/closing structure of a door 260 of the image forming apparatus 201 and the manual feed tray 10 of the manual feeding device 500 will be described with reference to FIGS. 3 to 6. In the present exemplary embodiment, the image forming apparatus 201 has the door 260 provided on the side so as to be openable and closable, and the manual feed tray 10 of the manual feeding device 500 provided so as to be openable and closable with respect to the door 260. The door 260 is an example of an opening/closing door, and is provided so as to be capable of turning around a rotary shaft 260*a* horizontal to the apparatus main body 201A. The door 260 is provided so as to be capable of opening and closing the apparatus main body 201A by turning between a first closed position (see FIG. 3) where the door 260 is closed with respect to the apparatus main body 201A and a first open position (see FIG. 4) where the door 260 is opened with respect to the apparatus main body 201A. When the door 260 is at the first closed position, the door 260 forms the re-conveyance path R that is a sheet conveyance path. The door 260 can be at an intermediate position between the first closed position and the first open position to open the re-conveyance path R.

The manual feeding device 500 is an example of a support unit, and is provided to be capable of turning around a rotary shaft 10*a* that is horizontal to the door 260. The manual feed tray 10 is provided to be capable of opening and closing the door 260 by turning between a second closed position (see FIG. 3) where the manual feeding device 500 is closed with respect to the door 260, and a second open position (see FIG. 1) where the manual feeding device 500 is open with respect to the door 260. At the second open position, the manual feeding device 500 supports the stacked sheets to be conveyed to the image forming unit 201B.

In the present exemplary embodiment, the manual feed tray 10 has a protruding part 500*a* that protrudes with respect to the door 260 when the door 260 is at the first closed position and the manual feed tray 10 of the manual feeding device 500 is at the second closed position. The protruding part 500*a* protrudes with respect to the door 260 beyond an outer surface 260*b* in a first direction D1 from the image forming apparatus 201 in the horizontal direction of the door 260 to the large-capacity feeding device 600 at the coupled position (see FIG. 3). In the present exemplary embodiment, the first direction D1 is oriented to the right side of the drawing.

Large-Capacity Feeding Device

Figure 3:
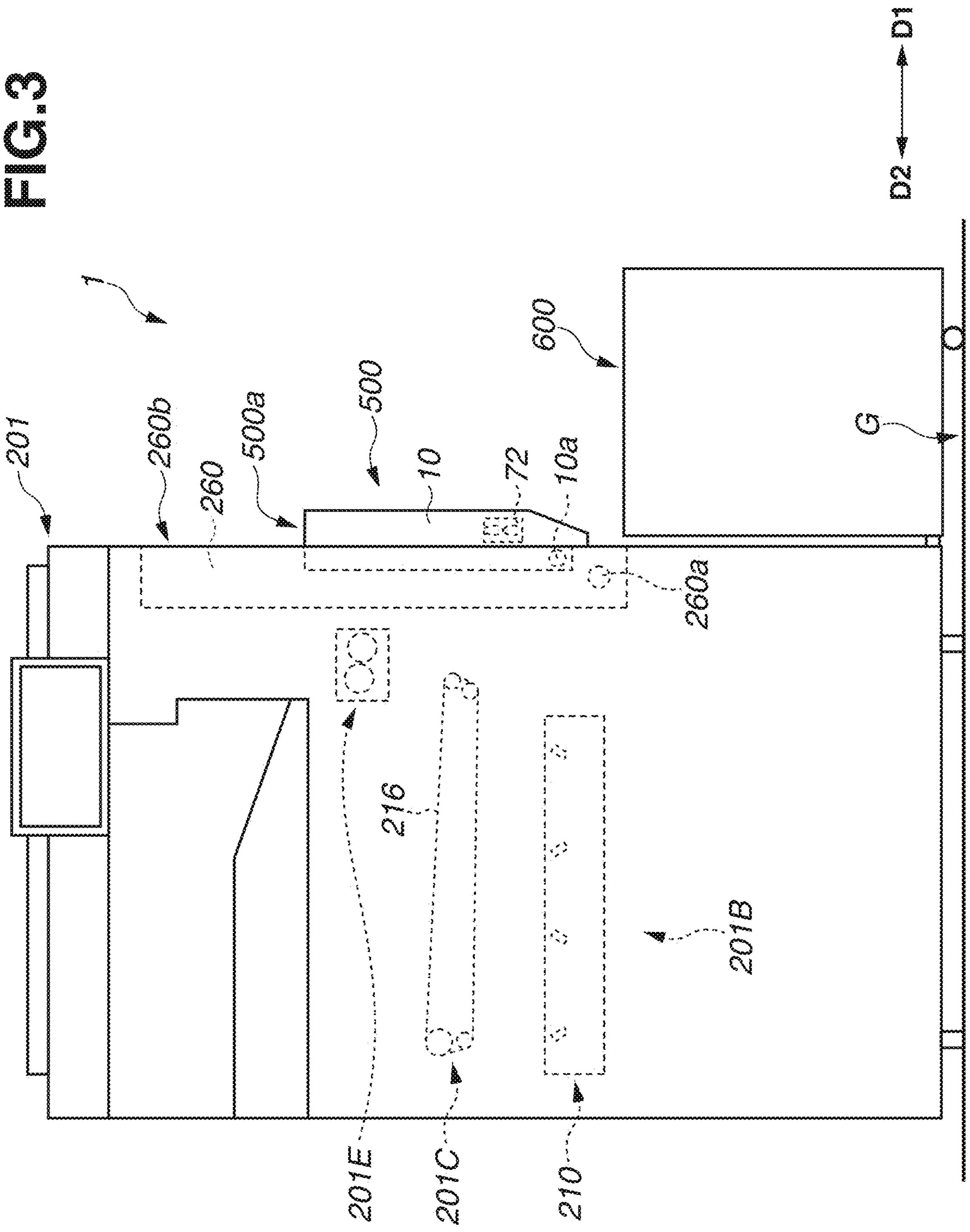
FIG. 3 is a front view of the image forming system, illustrating a state in which a large-capacity feeding device according to the exemplary embodiment is at a coupled position where it is coupled to the image forming apparatus.
Figure 4:
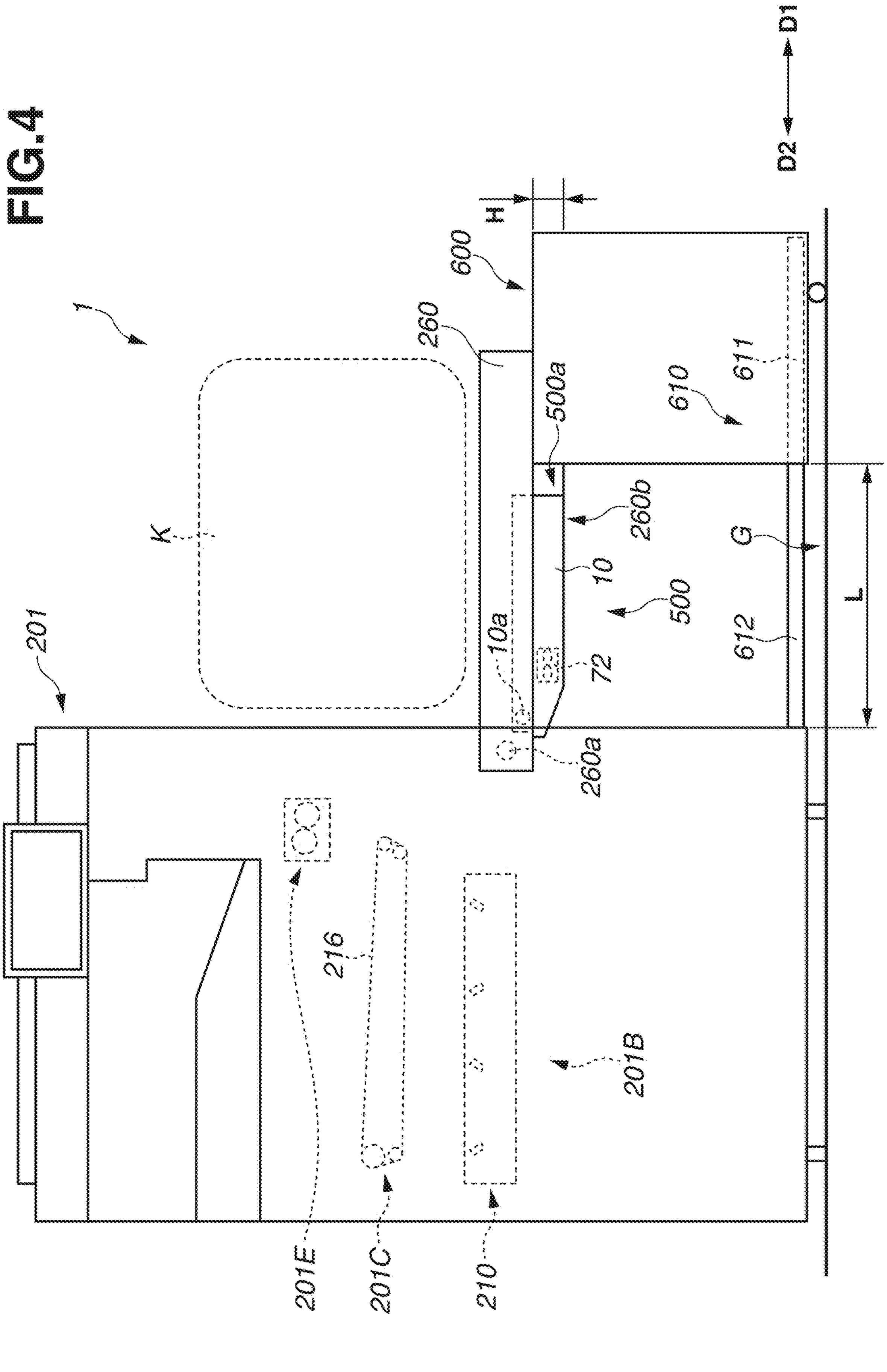
FIG. 4 is a front view of the image forming system, illustrating a state in which the large-capacity feeding device according to the exemplary embodiment is at a decoupled position where it is decoupled from the image forming apparatus.

The large-capacity feeding device 600 will be described with reference to FIGS. 3 and 4. The large-capacity feeding device 600 is movable in the direction horizontal to the image forming apparatus 201, and is movable between the coupled position (see FIG. 3) where it is coupled to the image forming apparatus 201 and the decoupled position (see FIG. 4) where it is decoupled from the image forming apparatus 201. As illustrated in FIG. 3, at the coupled position, the large-capacity feeding device 600 feeds the sheet S to the image forming apparatus 201. As illustrated in FIG. 4, at the decoupled position, the large-capacity feeding device 600 overlaps at least a portion of the door 260 and does not overlap the manual feed tray 10 of the manual feeding device 500 as viewed from above when the door 260 is at the first open position.

FIG. 3 is a side view of the image forming apparatus 201 in FIG. 1 with the manual feed tray 10 on the side closed. It is assumed that maintenance work is performed to replace each component of the image forming unit 201B illustrated by a dashed line inside the image forming apparatus 201 in FIG. 3. In this case, the first open position of the door 260 is a maintenance position at which maintenance is performed on the image forming unit 201B. Examples of replaceable components include the fixing unit 201E, the transfer unit 201C, the laser scanner 210, and the like.

The door 260 with the manual feed tray 10 turns around the rotary shaft 260*a*. If the door 260 is opened while the large-capacity feeding device 600 is connected to the image forming apparatus 201 as illustrated in FIG. 3, the protruding part 500*a* of the manual feed tray 10 comes into contact with the top surface of the large-capacity feeding device 600. When the protruding part 500*a* of the manual feed tray 10 comes into contact with the top surface of the large-capacity feeding device 600, the door 260 cannot be opened to the first open position, making it difficult to replace the fixing unit 201E, the transfer unit 201C, the laser scanner 210, and the like.

In the present exemplary embodiment, the large-capacity feeding device 600 is moved in the horizontal direction so that the door 260 can be opened sufficiently with respect to the apparatus main body 201A, so that the large-capacity feeding device 600 can be separated from the apparatus main body 201A by a distance L as illustrated in FIG. 4. Accordingly, the protruding part 500*a* of the manual feed tray 10 enters into the space formed by the separation of the distance L. The manual feed tray 10 overlaps the large-capacity feeding device 600 in the vertical direction by an overlap amount H. That is, when the large-capacity feeding device 600 is at the decoupled position and the door 260 is at the first open position, the large-capacity feeding device 660 is provided so as to overlap at least a portion of the protruding part 500*a* as viewed from the first direction D1. Accordingly, the door 260 opens to the first open position as illustrated in FIG. 4 to provide a maintenance space K, so that maintenance work can be performed without removing the manual feeding device 500, making it possible to achieve improvement in workability.

In the present exemplary embodiment, the first open position of the door 260 is a position where the door 260 is substantially horizontal.

This makes it possible to obtain a sufficient maintenance space. At the first open position, the door 260 may have a gap from the top surface of the large-capacity feeding device 600 or may be in contact with the top surface. That is, when the door 260 is at the first open position, the distance from the side surface of the apparatus main body 201A to the end of the door 260 is greater than L.

In the present exemplary embodiment, the large-capacity feeding device 600 has a guide unit 610 that guides the large-capacity feeding device 600 so as to be movable between the coupled position and the decoupled position. The guide unit 610 is attached to the large-capacity feeding device 600 and has a rail unit 611 with the first direction D1 as a longitudinal direction, and a pull-out unit 612 that is guided by the rail unit 611 so as to be movable in the first direction D1 and a second direction D2 opposite to the first direction D1. The leading end of the pull-out unit 612 is screwed to the image forming apparatus 201. Accordingly, the decoupled position is a position to which the coupled position is moved in the first direction D1. In the present exemplary embodiment, the large-capacity feeding device 600 can be easily moved by the guide unit 610 in the horizontal direction. This allows a user to perform maintenance work without calling a service person at the time of replacement of components.

In the present exemplary embodiment, the guide unit 610 is provided in the large-capacity feeding device 600. However, the present disclosure is not limited to this configuration, and the guide unit 610 may be provided in the image forming apparatus 201, or may be provided in both the large-capacity feeding device 600 and the image forming apparatus 201. In the present exemplary embodiment, the decoupled position is a position to which the coupled position is moved in the first direction D1, but the present disclosure is not limited to this configuration. For example, the decoupled position may be a position to which the coupled position is moved in a direction inclined with respect to the first direction D1, or a position to which the coupled position is moved in the width direction W.

The large-capacity feeding device 600 is separated from the image forming apparatus 201 by the distance L during maintenance, so that the space between the large-capacity feeding device 600 and the image forming apparatus 201 is widened. In the present exemplary embodiment, a cover 630 is provided to cover the floor surface directly below this space. That is, the plane where the large-capacity feeding device 600 at the coupled position is placed will be referred to as a placement surface G. The large-capacity feeding device 600 includes the cover 630 that is provided between the large-capacity feeding device 600 and the image forming apparatus 201 and configured to cover at least a portion of the placement surface G when the large-capacity feeding device 600 is at the decoupled position. Accordingly, even if some part is carelessly dropped, for example, it is possible to prevent the part from entering into between the large-capacity feeding device 600 and the floor surface. It is also possible to prevent human' hands or feet from unintentionally entering into between the large-capacity feeding device 600 and the floor surface. In the present exemplary embodiment, the cover 630 is supported by the pull-out unit 612 of the guide unit 610.

In the present exemplary embodiment, the cover 630 is provided in the large-capacity feeding device 600, but the present disclosure is not limited to this configuration. For example, the cover 630 may be provided in the image forming apparatus 201, or may be a member that is separate from both the large-capacity feeding device 600 and the image forming apparatus 201. The cover 630 does not need to be supported by the pull-out unit 612, and may be configured to cover the placement surface G by a door that is opened by vertically turning the side surface of the large-capacity feeding device 600 close to the image forming apparatus 201.

A configuration of the cover 630 will be described with reference to FIGS. 5 and 6. In the horizontal direction, the side on which the operation unit 730 of the image forming apparatus 201 is provided will be defined as a front side, and the opposite side will be defined as a rear side. The cover 630 is engaged with a shaft 633 so as to be rotatable with the width direction W as the longitudinal direction. The front end of the shaft 633 is engaged with a groove 631*a* of a front guide 631, and the rear end of the shaft 633 is engaged with a groove 632*a* of a rear guide 632, so that the shaft 633 can move along the grooves 631*a* and 632*a*.

The pull-out unit 612 has a front pull-out unit 612*a*, a rear pull-out unit 612*b*, and a pull-out cover unit 612*c* supported between the two pull-out units. A front end 630*a* of the cover 630 is placed on the front pull-out unit 612*a*, and a rear end 630*b* of the cover 630 is placed on the rear pull-out unit 612*b*. The pull-out cover unit 612*c* is supported between the front pull-out unit 612*a* and the rear pull-out unit 612*b*, moves along with the movement of the pull-out unit 612, and covers at least a portion of the placement surface G when the pull-out unit 612 is pull out.

Figure 5:
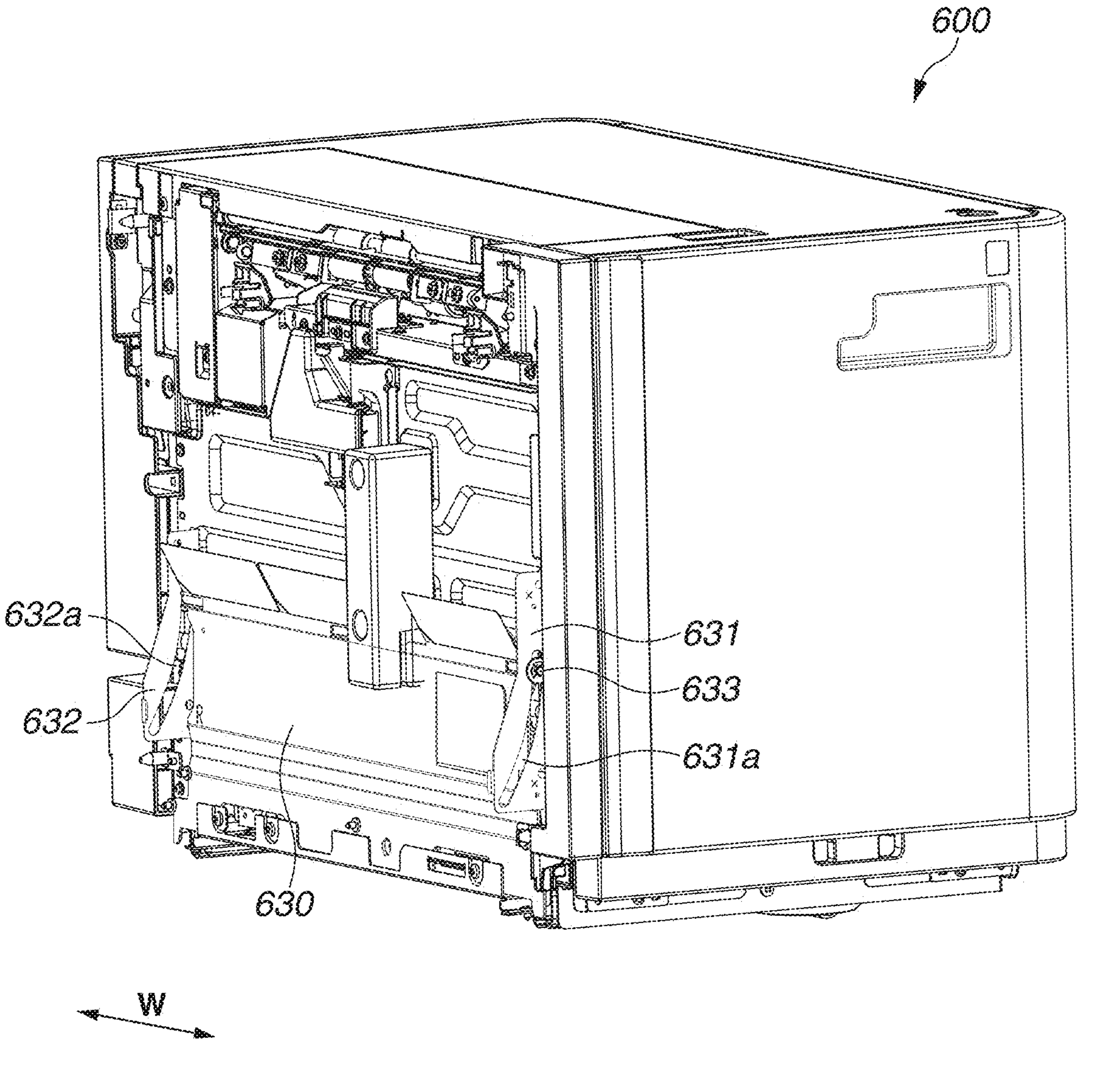
FIG. 5 is a perspective view of the large-capacity feeding device according to the exemplary embodiment, illustrating a state in which the large-capacity feeding device is at the coupled position where it is coupled to the image forming apparatus.
Figure 6:
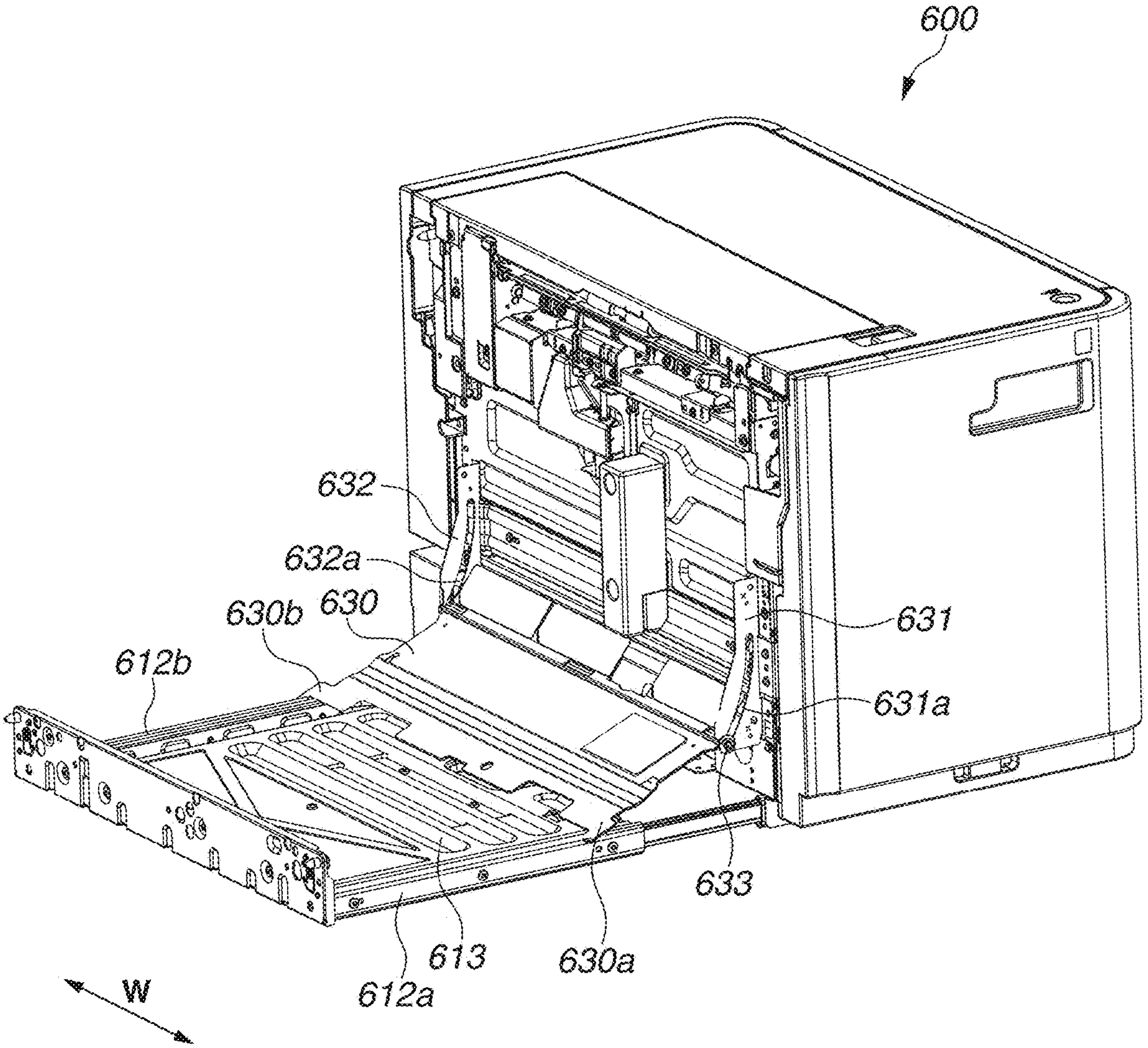
FIG. 6 is a perspective view of the large-capacity feeding device according to the exemplary embodiment, illustrating a state in which the large-capacity feeding device is at the decoupled position where it is decoupled from the image forming apparatus.

With this configuration, when the large-capacity feeding device 600 is connected to the image forming apparatus 201 as illustrated in FIG. 3, the cover 630 is in a substantially vertical state as illustrated in FIG. 5. When the large-capacity feeding device 600 is separated from the image forming apparatus 201 as illustrated in FIG. 4, the cover 630 is in a substantially horizontal state as illustrated in FIG. 6. The cover 630 moves from the state illustrated in FIG. 5 to the state illustrated in FIG. 6 by moving the large-capacity feeding device 600. Accordingly, even if some part is accidentally dropped, for example, it is possible to prevent the part from entering into between the large-capacity feeding device 600 and the floor surface. It is also possible to prevent human hands or feet from unintentionally entering into between the large-capacity feeding device 600 and the floor surface.

As described above, according to the image forming system 1 of the present exemplary embodiment, the large-capacity feeding device 600 is provided so as to overlap at least a portion of the protruding part 500*a* as viewed from the first direction D1 when the large-capacity feeding device 600 is at the decoupled position and the door 260 is at the first open position. Accordingly, the door 260 opens to the first open position as illustrated in FIG. 4 to provide the maintenance space K, so that the maintenance work can be performed without removing the manual feeding device 500. This improves the workability during the maintenance of the image forming apparatus 201.

According to the image forming system 1 of the present exemplary embodiment, the decoupled position is a position to which the coupled position is moved in the first direction D1, so the configuration of the guide unit 610 can be simplified as compared to the case where the coupled position is moved in another direction.

The image forming system 1 of the present exemplary embodiment includes the guide unit 610 to make it easy to move the large-capacity feeding device 600, and in particular, make it easy to position the large-capacity feeding device 600 to be coupled to the image forming apparatus 201. This can improve the overall workability during maintenance.

The image forming system 1 of the present exemplary embodiment includes the cover 630 that is located between the large-capacity feeding device 600 and the image forming apparatus 201 to cover at least a portion of the placement surface G when the large-capacity feeding device 600 is at the decoupled position. Accordingly, even if some part is accidentally dropped, it is possible to prevent the part from entering into between the large-capacity feeding device 600 and the floor surface, and it is also possible to prevent human hands or feet from unintentionally entering into between the large-capacity feeding device 600 and the floor surface.

In the above exemplary embodiment, the manual feeding device 500 includes the first air separation unit 74 and the second air separation unit 84. However, the present disclosure is not limited to this configuration, and the manual feeding device 500 may not include these units. In this case, when a large number of sheets are stacked, for example, the thickness of the manual feeding device 500 may increase to form the protruding part 500*a*.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2023-151609, filed Sep. 19, 2023, which is hereby incorporated by reference herein in its entirety.

What is claimed is:

1. An image forming system comprising:

an image forming apparatus; and a feeding device, the image forming apparatus including:

an image forming unit configured to form an image on a sheet;

a housing that stores the image forming unit;

an opening/closing door that is provided so as to be capable of turning around a rotary shaft horizontal to the housing, and that is openable and closable between a first closed position at which the opening/closing door is closed with respect to the housing and a first open position at which the opening/closing door is opened with respect to the housing; and a support unit that is provided so as to be capable of turning around a rotary shaft horizontal to the opening/closing door, that is openable and closable between a second closed position at which the support unit is closed with respect to the opening/closing door and a second open position at which the support unit is opened with respect to the opening/closing door, and that is configured to support a sheet when the support unit is at the second open position, and the feeding device being movable in a direction horizontal to the image forming apparatus, configured to move to a coupled position at which the feeding device is coupled to the image forming apparatus, move to a decoupled position at which the feeding device is decoupled from the image forming apparatus, and feed the sheet to the image forming apparatus when the feeding device is at the coupled position, wherein when the feeding device is at the decoupled position and the opening/closing door is at the first open position, the feeding device overlaps the support unit as viewed from a first direction from the image forming apparatus to the feeding device at the coupled position.

2. The image forming system according to claim 1, wherein when the opening/closing door is at the first open position, the feeding device overlaps a portion of the opening/closing door and does not overlap the support unit as viewed from above.

3. The image forming system according to claim 1, wherein the decoupled position is a position to which the feeding device at the coupled position is moved in the first direction.

4. The image forming system according to claim 3, further comprising a guide unit to be attached to the image forming apparatus and the feeding device and configured to guide the feeding device so that the feeding device is movable between the coupled position and the decoupled position.

5. The image forming system according to claim 4, wherein the guide unit includes:

a rail unit that is attached to the feeding device and has the first direction as a longitudinal direction; and a pull-out unit that is guided by the rail unit to be movable in the first direction and a second direction opposite to the first direction, has a leading end portion in the second direction fixed to the image forming apparatus, and is pulled out from the feeding device when the feeding device is moved from the coupled position to the decoupled position.

6. The image forming system according to claim 1, further comprising a cover that is located between the feeding device and the image forming device and configured to cover at least a portion of a placement surface when the feeding device is at the decoupled position, the placement surface being a surface on which the feeding device at the coupled position is placed.

7. The image forming system according to claim 4, further comprising a cover that is provided between the feeding device and the image forming device and configured to cover at least a portion of a placement surface when the feeding device is at the decoupled position, the placement surface being a surface on which the feeding device at the coupled position is placed, wherein the cover is supported by the guide unit.

8. The image forming system according to claim 1, wherein the first open position is a maintenance position at which maintenance is performed on the image forming unit.

9. The image forming system according to claim 1, wherein when the opening/closing door is at the first closed position, the opening/closing door forms a sheet conveyance path, and wherein the sheet conveyance path is a re-conveyance path for, after an image is formed on a first surface of the sheet by the image forming unit, re-conveying the sheet to form an image on a second surface of the sheet opposite to the first surface.

10. The image forming system according to claim 1, wherein the support unit has an air separation unit that blows air onto sheets supported by the support unit to separate the sheets.

* * * * *